United States Patent
Bullard

(12) 
(10) Patent No.: US 6,186,483 B1
(45) Date of Patent: *Feb. 13, 2001

(54) PRELOADED SPRING ASSEMBLY

(75) Inventor: Larry I. Bullard, Winston-Salem, NC (US)

(73) Assignee: L&P Property Management Company, South Gate, CA (US)

( * ) Notice: Under 35 U.S.C. 154(b), the term of this patent shall be extended for 0 days.

This patent is subject to a terminal disclaimer.

(21) Appl. No.: 09/262,556

(22) Filed: Mar. 4, 1999

Related U.S. Application Data

(63) Continuation-in-part of application No. 08/920,064, filed on Aug. 26, 1997.

(51) Int. Cl.$^7$ ............................................. F16F 3/00
(52) U.S. Cl. ................................. 267/89; 5/261
(58) Field of Search ........................ 267/89, 91, 94; 5/256, 251, 261

(56) References Cited

U.S. PATENT DOCUMENTS

| | | |
|---|---|---|
| 0,270,949 | 1/1883 | Gray . |
| 0,458,655 | 9/1891 | Edgar . |
| 1,455,847 | 5/1923 | Meutsch . |
| 1,804,821 | 5/1931 | Stackhouse . |
| 1,908,710 | 5/1933 | Kronheim . |
| 2,048,637 | 7/1936 | Lisson . |
| 2,265,532 | 12/1941 | Levine . |
| 2,657,740 | 11/1953 | Daniels et al. . |
| 2,680,475 | 6/1954 | Caton . |
| 2,820,970 | 1/1958 | Shapiro . |
| 3,082,438 | 3/1963 | Nachman, Jr. . |
| 3,331,105 | 7/1967 | Gordon . |
| 3,608,107 | 9/1971 | Kentor et al. . |
| 3,789,440 | 2/1974 | Garceau . |
| 5,449,151 | 9/1995 | Johnson . |
| 5,531,696 | 7/1996 | Menes . |
| 5,924,681 * | 7/1999 | Bullard ................................. 267/89 |

* cited by examiner

Primary Examiner—Robert J. Oberleitner
Assistant Examiner—Robert A. Siconolfi
(74) Attorney, Agent, or Firm—Wood, Herron & Evans, LLP

(57) ABSTRACT

A bedding or furniture spring product comprising a plurality of coil springs arranged in linear rows and columns. Each of the coil springs is preloaded by an endless strip of fabric, the strip of fabric encircling the exterior of one of the coil springs. The interior surface of the strip of fabric may be coated with a non-slip material so as to prevent the strip from falling or moving off the coil spring. Alternatively, the coil spring itself may be coated with a non-slip material. The strip of fabric leaves a portion of the end turns of the coil springs uncovered enabling the coil springs to be secured to a wire grid as for example by being wrapped around or clipped or laced to wires of the grid assembly. Alternatively, traditional hand 8-way tie may be used to connect the precompressed coil springs together and to a frame.

28 Claims, 3 Drawing Sheets

PRELOADED SPRING ASSEMBLY

CROSS REFERENCE TO RELATED APPLICATIONS

This application is a continuation-in-part application of U.S. patent application Ser. No. 08/920,064 filed Aug. 26, 1997 entitled "Preloaded Spring Assembly" and assigned to the assignee of this application, which application is herein incorporated by reference in its entirety.

FIELD OF THE INVENTION

The present invention relates to spring assemblies for use in furniture and bedding products; more particularly to furniture and bedding spring products in which the springs are preloaded prior to assembly.

DESCRIPTION OF THE PRIOR ART

Furniture and bedding products typically comprise a plurality of helical coil springs arranged in transversely extending rows and longitudinally extending columns of springs. The coil springs are generally secured in an assembled relationship by means of wire or steel connectors or helical lacing wires or by the upper and lower end turns of the coil springs being secured to a grid and/or wooden base. The coil springs are often of identical height in order to ensure a uniform "feel" across the entire width of the product. The height of these springs is often such that the product has a "soft feel" to it when one sits or lays on the product. This "soft feel" is caused by the load on the end turns of the coil springs causing the coil springs to compress a relatively large distance per unit load until the spring reaches a certain compression point at which point the amount of load necessary to compress the coil spring a further unit of distance is greatly increased. Until this compression point is reached, a lesser load is needed to initially compress the spring the first or initial unit of distance. The effect of this unequal reaction to the same load is that the user experiences a sinking feeling when initially laying or sitting on the spring assembly. This sinking effect is uncomfortable and disconcerting to the user of the product and may cause the user to think the product is not functioning correctly.

One method which has been used to eliminate this increasing resistance to compression of the springs or initial softness of the springs is to preload or precompress the coil springs before they are joined together into an assembly. Each individual coil spring is preloaded or partially compressed until the coil spring reaches the point at which this initial softness is eliminated. One method of preloading a coil spring before placing it in the assembly has been to place the individual coil spring inside a pocket of fabric material which encases the entire coil spring. Coil springs enveloped in fabric are called pocketed coil springs and are the subject of numerous patents, for example, U.S. Pat. Nos. 1,455,847 and 3,082,438.

Another method of preloading individual coil springs is to tie the coil springs to each other and downwardly in what is traditionally called an 8-way hand tie. Using this method, an operator manually compresses each coil spring the desired amount before tying 8 points of the end turns of each coil spring to another coil spring or to the frame of the spring assembly. Twine or rope is used to tie one side of a furniture frame to a number of different springs using knots and then to the other side of the frame. The springs are compressed to the proper level by a skilled artisan before being tied down to the frame. However, this method of preloading coil springs with all springs compressed to the same degree is very difficult to achieve with the result that only craftsmen who have repeated the procedure many times are able to achieve the requisite degree of precision and skill necessary to assemble an acceptable product. This skill requirement therefore necessarily increases cost and decreases productivity. Other difficulties encountered assembling a precompressed spring unit with a traditional 8-way hand tie are: 1) if fabric is used as the base, the fabric is subject to stretching or ripping; 2) the twine or rope may stretch over time causing the amount of compression of the coil springs to decrease over time; and 3) trying to establish a crown effect in the middle part of the spring assembly in which the coil springs are compressed less than at the edges of the assembly is difficult. Few artisans are skilled enough to practice this art.

One patent which discloses a coil spring assembly made of precompressed coil springs is U.S. Pat. No. 2,048,637. In this patent, two endless strips of fabric are wrapped around opposite sides of each coil spring in order to precompress the coil spring before the coil springs are assembled together. Helical lacing wire is wrapped through the endless strips of fabric in order to connect adjacent rows of coil springs together. A spring assembly made of preloaded coil springs as disclosed in this patent is excessively expensive and time consuming to manufacture, primarily because two endless strips of fabric are required to be wrapped around each coil spring.

Therefore, it has been an objective of the present invention to provide a preloaded spring assembly which is less costly and less labor intensive to produce than heretofore known preloaded spring assemblies.

Another objective of the present invention has been to construct a preloaded spring assembly without the use of traditional 8-way hand tying.

A further objective of the present invention has been to provide a preloaded spring assembly without the use of pocketed coil springs.

Another objective of the present invention has been to provide a spring assembly in which rows and columns of preloaded coil springs may be easily interconnected.

SUMMARY OF THE INVENTION

The invention which accomplishes these objectives comprises a bedding or furniture spring product comprising a spring assembly comprising a plurality of coil springs preferably arranged in linear columns and rows. Each of the coil springs is compressed or preloaded by an endless strip or loop of fabric which encircles the exterior of each of the coil springs in the bedding or furniture spring product. Each of the coil springs has an upper end turn, a lower end turn and a central spiral portion between the end turns. The endless strip of fabric passes across and above the top end turn of each coil spring, along the exterior sides of the central spiral portion of the coil spring and across the bottom below the lower end turn of the coil spring. Typically, the endless strip of fabric does not contact the central spiral portion of the coil spring but does contact the upper and lower end turns of the coil spring. The strip of fabric is of a width sufficient to hold the coil spring in a compressed condition without ripping or tearing but is of a width less than the diameter of the end turns of the coil spring. Consequently, a portion of the upper and lower end turns is exposed and not covered by the strip of fabric. These uncovered portions are aligned with one another so that a helical lacing wire or other attaching means or device may attach adjacent springs by encircling the uncovered portions of the end turns of the coil springs without penetrating or tearing the strip of fabric.

In order to prevent the strip of material from sliding off the compressed coil spring and causing the coil spring to decompress into a relaxed condition, the strip of fabric is preferably made of a knitted, woven, non-woven or other fabric material having non-slip properties such as those imparted by a coating of foamed polyvinyl chloride (PVC). Alternatively, the strip of fabric may be made of any fabric material sprayed or coated on the interior surface thereof with a non-slip material such as PVC so that when the fabric encircles the coil spring, the non-slip surface on the inside of the strip contacts the end turns of the coil spring and prevents the strip from sliding off the coil spring. Yet another alternative for preventing the strip of fabric from sliding off of the compressed coil spring is to coat the end turns of the coil springs with a non-slip material such as polyvinyl chloride (PVC).

A coil spring assembly used for furniture or bedding made in accordance with this invention may have the preloaded springs interconnected by helical lacing wires or metal clips or may have the springs interconnected to wire grids. In the later case, a wire grid in the top plane of the assembly generally comprises a border wire and a plurality of crossing wires connected at the ends to the border wire. The uncovered portions of the end turns of the preloaded springs may be wrapped around the crossing wires of the grid or the crossing wires of the grid may be wrapped around the exposed portions of the end turns in order to secure the coil springs relative to the upper grid. Alternatively, the crossing wires of the grid may be attached to the exposed portions of the end turns of the preloaded springs by means of conventional metal clips.

Rather than have the lower end turns of preloaded springs of a spring assembly made in accordance with the practice of this invention interconnected by lacing wires, or by metal clips or by a wire grid, the exposed portions of the preloaded springs may be attached to a wooden base, as for example a wooden box spring base, in which event the end turns of each of the coil springs would generally be secured via staples or other conventional fasteners to wooden members of the base.

Still another application for a spring assembly made in accordance with the practice of this invention is in a traditional 8-way hand tied assembly. In such an assembly, the preloaded coil springs are placed inside a frame and tie downs are secured between the top of the frame and the upper end turns of the coil springs. The tie downs are tied tightly in order to maintain the compression of the coil springs and to secure the coil springs in the correct aligned orientation. Due to the preloading or precompression of the coil springs imparted by the strip of fabric wrapped around the individual coil springs, the coil springs do not have to be compressed by the tie downs of the assembly as in heretofore known 8-way hand tied spring assemblies with the result that less skilled artisans may successfully create the tie downs.

DESCRIPTION OF THE PREFERRED EMBODIMENTS

Figure 1:
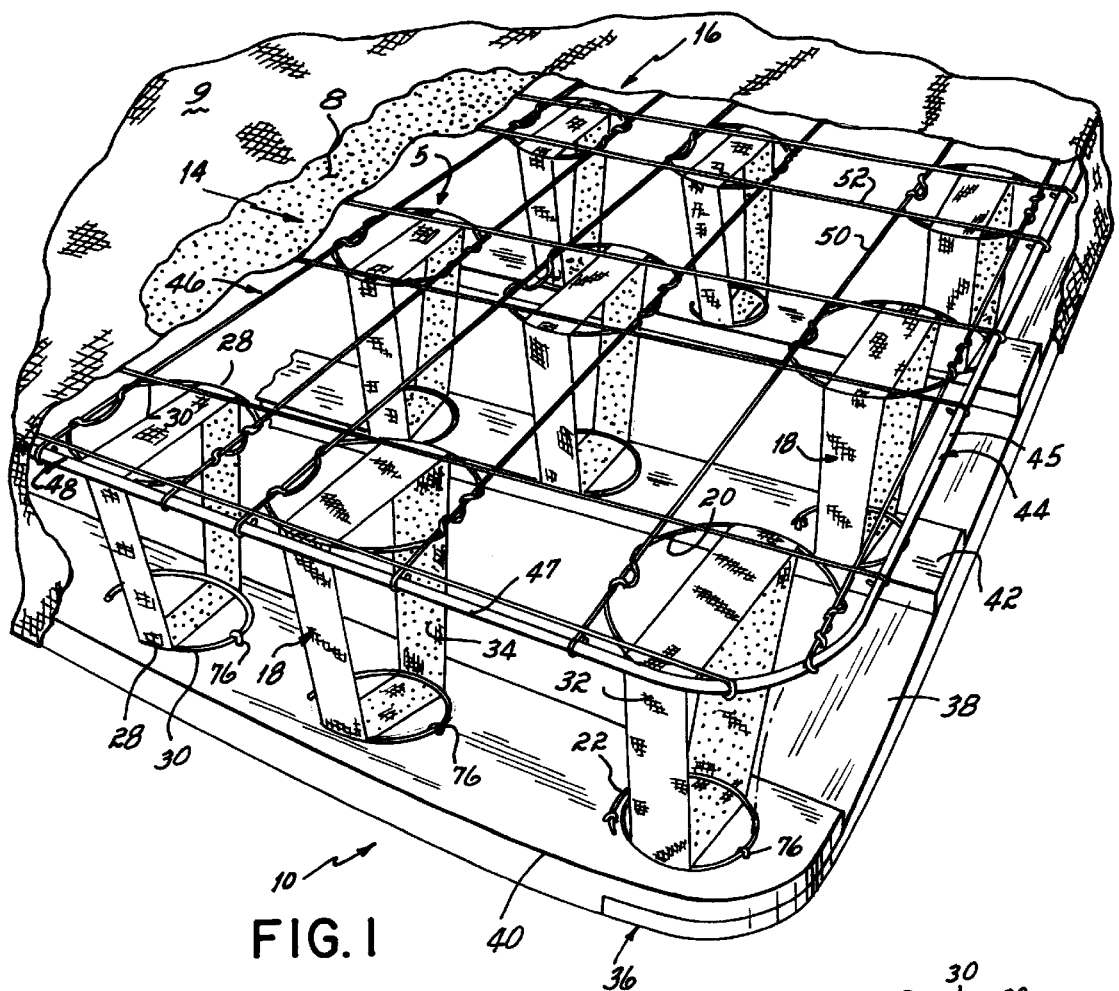
FIG. 1 is a perspective view of a furniture spring product utilizing preloaded coil springs of the present invention secured to a wooden base.

Referring to FIG. 1, the present invention comprises a spring assembly 10 of preloaded coil springs 5 used in the construction of a bedding or furniture product. The spring assembly 10 comprises a plurality of preloaded coil springs 5 arranged in transversely extending rows 14 and longitudinally extending columns 16. The spring assembly 10 is covered with at least one mattress pad 8. An upholstered covering 9 encases the mattress pad 8 and spring assembly 10.

Figure 2:
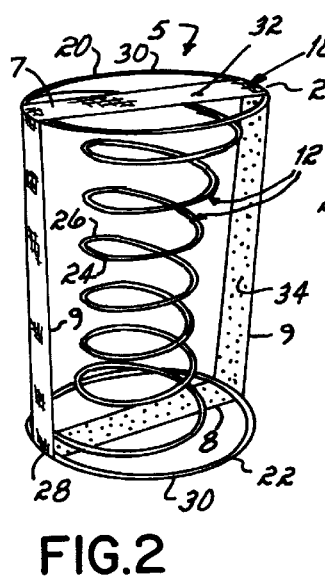
FIG. 2 is a perspective view of one preloaded coil spring of the furniture spring product of FIG. 1, this particular coil spring having end turns of approximately identical diameter.
Figure 3:
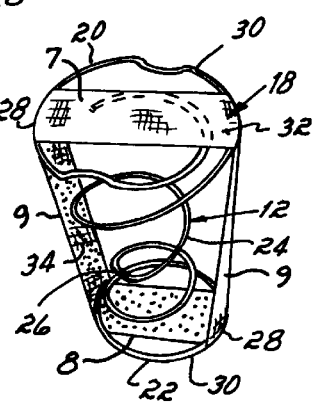
FIG. 3 is a perspective view of another preloaded coil spring, this particular coil spring having a lower end turn of a lesser diameter than the diameter of the upper end turn of the coil spring.

As best illustrated in FIGS. 2 and 3, each of a plurality of coil springs 12 is preloaded or precompressed by a strip of fabric 18. The strip of fabric 18 wraps around the exterior of the coil spring 12 causing the coil spring to be preloaded to a predetermined axial length before a plurality of preloaded coil springs are assembled. Each coil spring 12 has an upper end turn 20, a lower end turn 22 and a central spiral portion 24 comprising a plurality of convolutions 26. The coil spring of FIG. 2 has an upper end turn 20 and a lower end turn 22 of approximately the same diameter and a plurality of convolutions 26 in the central spiral portion 24 of the coil spring of a lesser diameter than the diameter of the end turns 20, 22 of the coil spring 12. Consequently, when the strip of fabric 18 is wrapped around the exterior of one of the coil springs 12, the strip of fabric 18 contacts only opposite ends 28 of the upper and lower end turns 20, 22 without contacting any other portion of the coil spring. The strip of fabric 18 covers a portion of the upper and lower end turns 20, 22 of the coil springs while leaving the remaining portions 30 of the upper and lower end turns 20, 22 exposed and uncovered.

The strip or loop of fabric 18 when compressing a coil spring 12 comprises a generally planar top portion 7 extending across the upper end turn 20 of the coil spring 12, a generally planar bottom portion 8 extending across the lower end turn 22 of the coil spring 12 and a pair of opposed side portions 9, each side portion 9 extending between the upper end turn 20 and the lower end turn 22 of the coil spring 12.

As illustrated in FIG. 3, the diameters of the upper and lower end turns of the coil spring do not have to be identical.

In the coil spring of FIG. 3, the upper end turn 20 has a larger diameter than the lower end turn 22 and the central convolutions 26 have increasing diameters as the convolutions 26 move upward along the central spiral portion 24 of the coil spring 12. However, the strip of fabric 18 acts the same way on the coil spring regardless of whether the coil spring has end turns of identical diameter or differing diameters. The strip of fabric 18 precompresses the coil springs to a predetermined axial length causing the central convolutions 26 to move closer together, thereby eliminating the initial "soft" feel of a coil spring assembly when loaded by a user.

Figure 4:
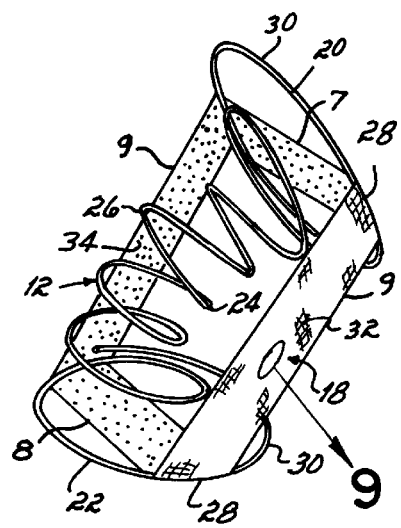
FIG. 4 is a perspective view of the preloaded coil spring of FIG. 2 but with the spring being loaded to one side.

The strip of fabric 18 has an exterior surface 32 and an interior surface 34. The interior surface 34 contacts the end turns 20, 22 of the coil springs and according to one aspect of the invention of this application, has non-slip characteristics in order to prevent the strip of fabric 18 from slipping off the end turns, particularly when one side of the coil spring is loaded and compressed to a greater extent than the opposite side as illustrated in FIG. 4. In order to prevent the strip of fabric 18 from falling or moving off and away from the coil spring when the coil spring is loaded to one side as seen in FIG. 4, the strip of fabric 18 is preferably coated with a non-slip material such as polyvinyl chloride (PVC). Alternatively, if the strip of fabric 18 is not coated with a non-slip material, the inner surface 34 of the fabric strip 18 may be coated with a material which has non-slip properties such as foamed polyvinyl chloride. Alternatively, only those portions of the inner surface 34 of the strip of fabric 18 which contact the end turns may be coated with a non-slip material. As yet another alternative, the strip of fabric 18 may not have any non-slip properties, but the coil spring itself may be coated with a non-slip type material such as foamed polyvinyl chloride to accomplish the same objective of insuring that the strip of fabric does not fall away from the coil spring when the coil spring is loaded to one side as illustrated in FIG. 4.

The strip of fabric 18 can be made from a variety of materials, such as polyester, paper, cloth, nylon, polyvinyl chloride, non-woven low density polyethylene (LDPE) or other materials capable of producing a film, knitted, woven or nonwoven layer. In one preferred embodiment, the strip of fabric 18 comprises a knitted polyester reinforcement 21 such as polyethylene terephthalate (PET) which is initially coated on exterior surface 32 and interior surface 34 with a polyvinyl chloride plastisol containing a foaming agent and plasticizer, creating a foamed, cured product upon application of sufficient heat. Under processing conditions known to those of skill in the art, the foamed, cured product comprised of knitted polyester reinforcement such as scrim coated on both sides with PVC foam and plasticizer has an open pore construction, which in combination with the grip provided by the foamed PVC surfaces and dispersed plasticizer, provides a non-slip surface in contact with the end turns 20, 22 of the coil springs. A representative product is "SULTAN" produced by Vantage Industries of Atlanta, Georgia. This product has a weight of approximately 16 ounces per square yard and a thickness of 140 to 150 thousandths of an inch.

Figure 9:
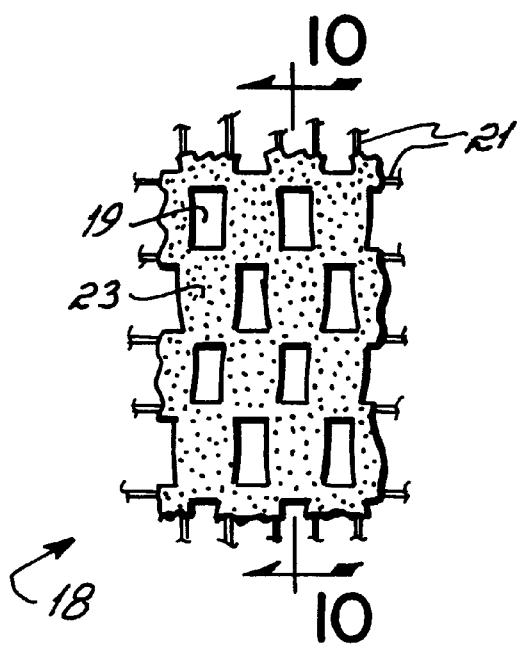
FIG. 9 is a fragmentary, elevational view of the strip of fabric of encircled area 9 of FIG. 4.
Figure 10:
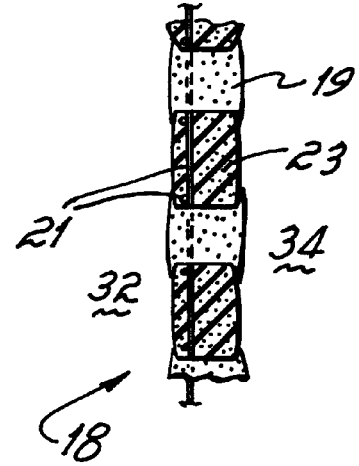
FIG. 10 is a cross-sectional view taken along the line 10—10 of FIG. 9.

As illustrated in FIG. 9, the strip of fabric 18 may have an open pore construction. Holes or openings 19 may be interspersed throughout the strip of fabric 18. As illustrated in FIG. 10, the strip of fabric 18 may comprise a knitted polyester reinforcement 21 coated on both sides with a mixture of PVC foam and plasticizer 23. The reinforcement 21 is located approximately midway between the exterior surface 32 and interior surface 34 of the strip 18.

As illustrated in FIG. 1, the spring assembly 10 of the present invention may be incorporated into a box spring having a wooden base 36. The wooden base 36 comprises two side pieces 38 and two opposed end pieces 40. The two side pieces 38 and two end pieces 40 form the periphery of the wooden base 36 of the box spring or foundation. Extending substantially parallel the end pieces 40 are a plurality of spaced interior wooden slats 42 secured to the tops of the side pieces 38. The lower end turns 22 of the coil springs 12 of the assembly are stapled or otherwise secured to the interior slats 42 and end pieces 40 of wooden base 36.

The coil spring assembly 10 illustrated in FIG. 1 further comprises a generally rectangular endless border wire or rod 44 and a plurality of crossing wires or members 46 secured to the border wire 44. The crossing wires 46 and border wire 44 form an upper grid 48 of the spring assembly 10. The endless border wire 44 comprises two longitudinally extending side border wire sections 45 and two end border wire sections 47. The crossing wires 46 comprise a plurality of longitudinally extending first wires 50 which are spaced in a transverse direction and extend substantially parallel to side border wire sections 45 and a plurality of transversely extending spaced second wires 52 which are spaced in a longitudinal direction and extend parallel to the end border wire sections 47. The first and second wires 50 and 52 are preferably welded at their intersections and are wrapped at their ends around the border wire 44. The ends of the wires 50 and 52 may alternatively be welded to border wire 44.

As illustrated in FIG. 1, the preloaded coil springs 5 may be secured to the upper grid 48 by wrapping the uncovered portions 30 of the upper end turns 20 of the coil springs 12 around the first wires 50 of the upper grid as is disclosed in U.S. Pat. No. 3,789,440 assigned to the Assignee of the present invention. Alternatively, helical lacing wires may be used to connect the upper end turns 20 of the coil springs 12 to the first or second crossing wires 50, 52 of the upper grid 48 or the first and second crossing wires 50, 52 of the upper grid 48 may be wrapped around the upper end turns 20 of the coil springs.

The lower end turns 22 of the preloaded coil springs 5 of the spring assembly 10 may be secured to the wooden base 36 by staples 76. Staples 76 secure the lower end turns 22 of the two endmost rows of coil springs to the two end pieces 40 of the base 36. The remainder of the coil springs 12 are secured to the interior wooden slats 42 of the base 36. Alternatively, the strip of fabric 18 may be stapled directly to the wooden members of the base as opposed to having the uncovered portions of the lower end turns 22 stapled to the base members.

Figure 5:
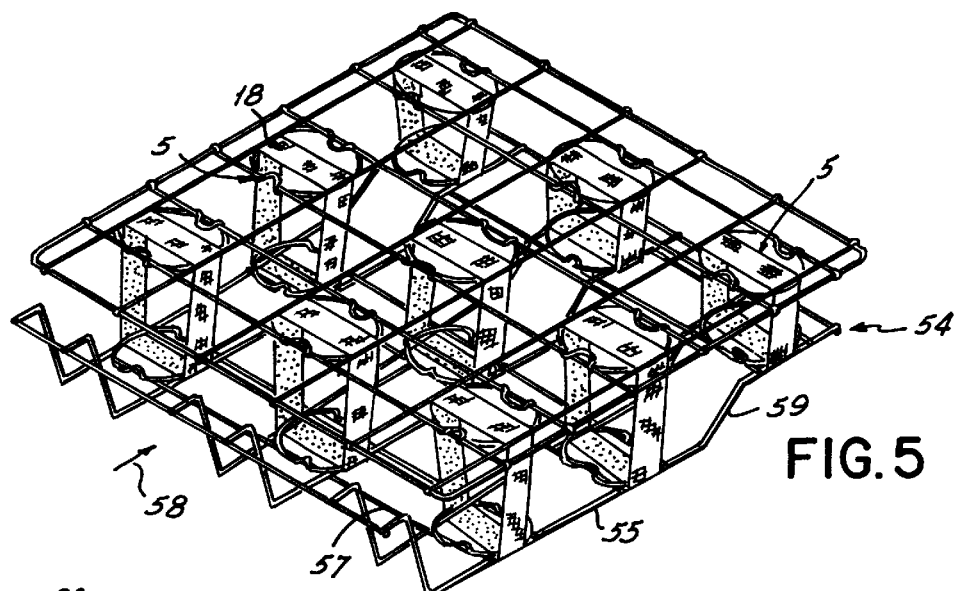
FIG. 5 is a perspective view of a spring assembly comprising preloaded coil springs having upper and lower grids connected to the end turns of the coil springs.

Instead of the bottom of the spring assembly comprising a wooden base, the lower end turns 22 of the preloaded coil springs 5 may be attached to a lower welded wire grid 54 as illustrated in FIG. 5. The lower grid 54 comprises a plurality of spaced, longitudinally extending wires 55 and a plurality of spaced transversely extending wires 57, the wires 55 and 57 crisscrossing each other and preferably secured as by welding at their points of intersection. As illustrated in FIG. 5, the longitudinally extending wires 55 of the lower grid 54 may have one or more sloped portions 59 in order to accommodate one or more rows of coil springs 14 of a lesser height than the other rows of coil springs of a seat cushion for example. One reason for constructing a seat cushion with coil springs having different axial lengths is to make certain portions of the cushion have a "firmer" feel than other portions of the cushion.

FIG. 5 illustrates three rows of preloaded coil springs, the preloaded coil springs of the last row being of a lesser height than the preloaded coil springs of first two rows so the rear of the cushion has a "firmer" feel than the front of the cushion. The preloaded coil springs of each row may be of identical height or may be varied depending upon the desired characteristics of the spring assembly. As illustrated in FIG. 5, the lower end turns 22 of the coil springs 12 may be bent underneath and around the transversely extending wires, thereby securing the lower end turns 22 of the coil springs 12 to the lower grid 54.

Figure 6:
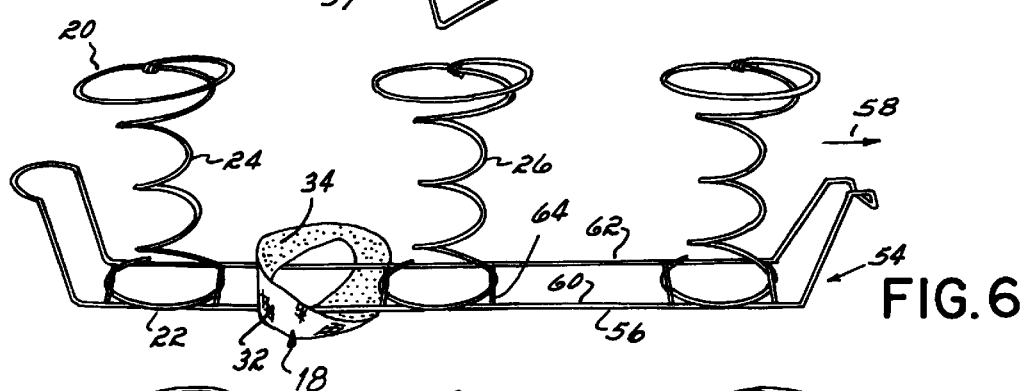
FIG. 6 is a perspective view of a row of coil springs mounted upon a wire grid, each spring being secured to the grid preparatory to a loop of fabric being wrapped around one of the coil springs and the lower grid.
Figure 7:
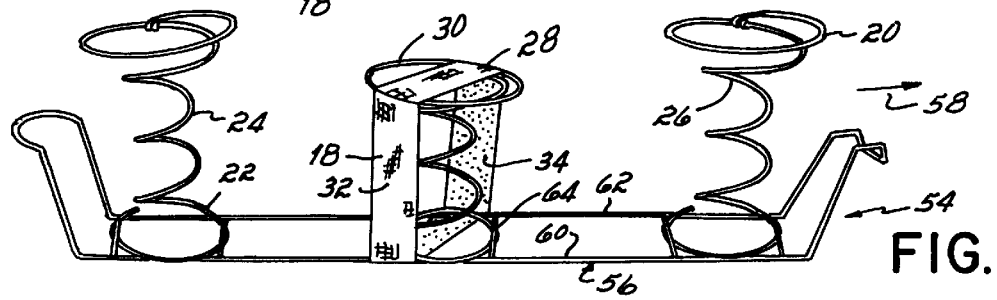
FIG. 7 is a perspective view of the row of coil springs and grid of FIG. 6 after application of the loop of fabric to one of the coil springs.

Alternatively, as illustrated in FIG. 6, the lower grid 54 may comprise a plurality of pairs 56 of spaced wires extending longitudinally or in direction 58. Each pair of wires 56 comprises a first wire 60 and a second wire 62 between which there extend a plurality of transverse securing wires 64. The securing wires 64 extend in a direction perpendicular to the direction 58 of the sets of wires 56. The securing wires 64 pass over the top of the uncovered portions 30 of the lower end turns 22 of the coil springs 12 in order to secure the coil springs 12 to the lower grid 54 as shown in FIGS. 6 and 7. The diameter of the lower end turns 22 of the coil springs must be large enough so that two opposing portions of the end turns 22 rest on top of first and second wires 60, 62 of the lower grid 54 and two other portions of the end turn 22 are pinned underneath securing wires 64.

FIG. 6 illustrates a strip of fabric 18 before it is wrapped around the middle coil spring of a row of three coil springs. The strip of fabric 18 is wrapped around one set of wires 56 but is not placed around any of the coil springs. FIG. 7 illustrates the strip of fabric 18 being wrapped around the middle of the three coil springs of FIG. 6, precompressing the coil spring to the desired height and rigidity.

Figure 8:
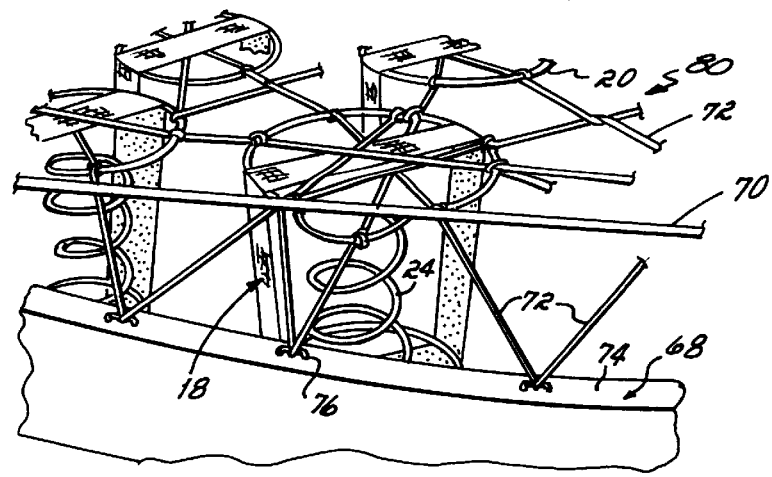
FIG. 8 is a perspective view of a spring product utilizing preloaded coil springs in accordance with the present invention in which the coil springs are attached to a frame by traditional 8-way hand tying.

FIG. 8 illustrates an alternative embodiment of the present invention in which a wooden frame 68 is placed around the coil spring assembly. An upper border wire 70 is placed directly above the frame 68 and surrounds the assembly. Each of the coil springs is preloaded or precompressed with a strip of fabric 18 in accordance with the present invention and is secured to the frame via tie downs 72. The tie downs 72 are secured to the upper surface 74 of the frame 68 by staples 76 or other securing devices. The tie downs 72 are wrapped once on one side of the upper end turn 20 of the coil spring 12 then pass over the top of the strip of material 18 before being tied to the other uncovered portion of the coil spring and being tied to other coil springs. In this way, adjacent coil springs are connected together and connected to frame 68. The tie downs 72 extending between the upper end turns 20 of the coil springs 12 form an upper grid 80 joining the coil springs 20 into an assembly. One advantage of the present invention is that in securing coil springs together using this traditional 8-way tie, an operator need not precompress the springs because the strip of fabric already precompresses the strings the desired amount. Therefore, less skill and effort is needed to manufacture a spring assembly using this traditional 8-way tie down method than heretofore possible.

While I have illustrated several embodiments of the present invention, those skilled in the art will appreciate changes and modifications which may be made without departing from the spirit of our invention.

Therefore, I intended to be limited only by the scope of the following claims:

1. A bedding or furniture spring product comprising:
    a spring assembly comprising a plurality of coil springs arranged in longitudinally extending columns and transversely extending rows, each of said coil springs having an upper end turn and a lower end turn, said upper end turns of said coil springs being secured to a grid, at least one of said coil springs being maintained in a compressed condition by a strip of fabric, said strip of fabric encircling the exterior of said at least one coil spring, and being of a width less than the diameter of at least one of said upper end turn and said lower end turn of said at least one coil spring, wherein one of said strip of fabric and said at least one coil spring has a non-slip surface,
    a mattress pad, and
    an upholstered fabric covering encasing said spring assembly and said mattress pad.

2. A bedding or furniture spring product comprising:
    a spring assembly comprising a plurality of coil springs arranged in longitudinally extending columns and transversely extending rows, each of said coil springs having an upper end turn and a lower end turn, said upper end turns of said coil springs being secured to a grid, at least one of said coil springs being maintained in a compressed condition by a strip of fabric, said strip of fabric encircling the exterior of said at least one coil spring and being of a width less than the diameter of at least one of said upper end turn and said lower end turn of said at least one coil spring wherein at least one of said strip of fabric and said at least one coil spring has a non-slip surface.

3. The spring product of claim 2 wherein at least one of said strip of fabric and said at least one coil spring is coated with a non-slip material.

4. The spring product of claim 2 wherein said strip of fabric has an inner surface and an outer surface, said inner surface contacting said end turns of said at least one coil spring.

5. The spring product of claim 2 wherein said grid comprises a wire grid comprising a border wire and a plurality of crossing members.

6. The spring product of claim 2 wherein said spring assembly further comprises a base, said lower end turns of said coil springs being secured to said base.

7. The spring product of claim 6 wherein said base is a lower wire grid.

8. The spring product of claim 2 wherein said upper end turns of said coil springs are wrapped around members of said grid.

9. A bedding or furniture spring product comprising:
    a spring assembly comprising plurality of coil springs arranged in longitudinally extending columns and transversely extending rows, each of said coil springs being made of a single piece of wire and having a central spiral portion, an upper end turn of a fixed diameter and a lower end turn of a fixed diameter, each of said coil springs being held and maintained in a compressed condition by a strip of fabric, a portion of said strip of fabric passing generally around the exterior of said coil spring over said upper end turn, another portion of said strip of fabric passing below said lower end turn and additional portions of said strip of fabric passing outside said central spiral portion of said coil spring, said portion of said strip of fabric extending across said upper end turn of said coil spring being parallel said portion of said strip of fabric extending across said lower end turn of said coil spring, said strip of fabric being of a width less than the diameter of said end turns such that a portion of each of said upper and lower end turns is uncovered.

10. The spring product of claim 9 further comprising an upper grid secured to the uncovered portions of the upper end turns of said coil springs.

11. The spring product of claim 9 further comprising a lower grid secured to the uncovered portions of said lower end turns of said coil springs.

12. The spring product of claim 9 further comprising a base, the uncovered portions of the lower end turns of said coil springs being attached to said base.

13. The spring product of claim 9 further comprising:

an upper rectangular border wire, a plurality of crossing wires secured to said border wire, and means attaching said crossing wires to said upper end turns of said coil springs.

14. The spring product of claim 13 wherein said crossing wires are secured to uncovered portions of said upper end turns of said coil springs.

15. The spring product of claim 12 wherein the uncovered portions of said lower end turns are secured to said base with staples.

16. The spring product of claim 9 wherein at least one of said strip of fabric and said coil spring is has a non-slip surface.

17. The spring product of claim 9 wherein at least one of said strip of fabric and said coil spring is coated with a non-slip material.

18. A bedding or furniture spring product comprising:

a spring assembly including plurality of coil springs, each coil spring having an upper end turn of a first diameter, a lower end turn of a second diameter and a central spiral portion, each coil spring being held in a compressed condition by a strip of fabric surrounding and covering portions of said coil spring, said strip of fabric passing below said lower end turn, outside opposed sides of said central spiral portion and above said upper end turn, said strip of fabric being of a width less than said diameters of said end turns so as to not cover portions of said end turns, at least one of said strip of fabric and said coil spring having a non-slip surface to prevent said strip of fabric from sliding off said partially compressed coil spring.

19. The spring product of claim 18 wherein at least one of said strip of fabric and said coil spring is coated with a non-slip material.

20. The spring product of claim 18 wherein said upper end turns of said coil springs are secured to an upper grid and said lower end turns of said coil springs are secured to a base.

21. The spring product of claim 18 wherein said strip of fabric comprises a knitted polyester reinforcement coated with polyvinyl chloride.

22. The spring product of claim 18 wherein said strip of fabric has an open pore construction.

23. A method of making a spring product comprising:

providing a plurality of coil springs, each of said coil springs having an upper end turn of a first diameter, a lower end turn of a second diameter and a plurality of central convolutions between said upper end turn and said lower end turn, preloading at least one of said coil springs by wrapping a strip of fabric having a width less than the diameter of one of said upper and lower end turns around an exterior of said coil spring when said coil spring is at least partially compressed, such that said strip contacts only opposite ends of said upper and lower end turns, securing said upper end turns of said coil springs to an upper grid, and securing said lower end turns of said coil springs to a base.

24. The method of making a spring product of claim 23 wherein securing said upper end turns of said coil springs to an upper grid comprises wrapping uncovered portions of said upper end turns around wires of said upper grid.

25. The method of making spring product of claim 23 wherein securing said lower end turns of said coil springs to a base comprises securing uncovered portions of said lower end turns to said base.

26. A bedding or furniture spring product comprising:

a spring assembly comprising a plurality of coil springs, each of said coil springs having an upper end turn, a lower end turn and a plurality of convolutions between said end turns, at least one of said coil springs being maintained in a partially compressed condition by a strip of fabric, said strip of fabric encircling the exterior of said at least one coil spring such that said strip of fabric contacts opposite ends of the upper and lower end turns, said strip of fabric being of a width less than the diameter of at least one of said upper end turn and said lower end turn of said at least one coil spring; and a grid secured to said upper end turns of said coil springs.

27. The bedding or furniture spring product of claim 26 wherein at least one of said strip of fabric and said at least one coil spring has a non-slip surface.

28. The bedding or furniture spring product of claim 26 wherein said lower end turns of said coil springs are secured to a base.

* * * * *